United States Patent [19]

Nakayama

[11] Patent Number: 5,038,011
[45] Date of Patent: Aug. 6, 1991

[54] WIRE CUT ELECTRIC DISCHARGE MACHINING METHOD
[75] Inventor: Yoshiro Nakayama, Aichi, Japan
[73] Assignee: Mitsubishi Denki K.K., Tokyo, Japan
[21] Appl. No.: 326,759
[22] Filed: Mar. 21, 1989
[30] Foreign Application Priority Data Mar. 22, 1988 [JP] Japan .................................. 63-65851

[51] Int. Cl.⁵ ............................................... B23H 7/06
[52] U.S. Cl. ................................ 219/69.12; 219/69.17
[58] Field of Search .............. 219/69.12, 69.17, 69.13; 204/224 M

[56] References Cited

U.S. PATENT DOCUMENTS

| | | | |
|---|---|---|---|
| 4,510,367 | 4/1985 | Obara | 219/69.13 |
| 4,544,819 | 10/1985 | Nomura et al. | 219/69.17 |
| 4,547,646 | 10/1985 | Briffod | 219/69.12 |
| 4,598,190 | 7/1986 | Balleys | 219/69.12 |
| 4,649,252 | 3/1987 | Obara | 219/69.12 |
| 4,820,894 | 4/1989 | Francois et al. | 219/69.12 |

FOREIGN PATENT DOCUMENTS

| | | | |
|---|---|---|---|
| 137834 | 10/1980 | Japan | 219/69.17 |
| 137835 | 10/1980 | Japan | 219/69.17 |
| 102426 | 8/1981 | Japan | 219/69.12 |
| 102724 | 6/1982 | Japan | 219/69.12 |
| 62-9826 | 1/1987 | Japan | 219/69.12 |
| 62-44318 | 2/1987 | Japan | 219/69.12 |
| 208829 | 9/1987 | Japan | 219/69.12 |

Primary Examiner—Geoffrey S. Evans
Attorney, Agent, or Firm—Sughrue, Mion, Zinn, Macpeak & Seas

[57] ABSTRACT

The method of preventing a workpiece from being rocked in the machining groove of a workpiece when the wire electrode approaches the final discharge-machining point. As a result, the remaining core can be removed positively and machining accuracy is improved.

5 Claims, 2 Drawing Sheets

WIRE CUT ELECTRIC DISCHARGE MACHINING METHOD

BACKGROUND OF THE INVENTION

This invention relates to a wire cut electric discharge machining method in which electric discharge is caused to occur between a workpiece and a wire electrode through a machining solution.

FIG. 1 is an explanatory diagram showing the arrangement of an electric discharge machine. FIGS. 3A and 3B are a plan view for a description of a conventional wire cut electric discharge machining method.

In FIG. 1, reference numeral 1 designates a wire electrode; 2, a workpiece; 3, a table; 4, a wire guide section including a machining solution supplying section; 5, a machining contour along which the workpiece is cut; and 6, a robot for handling and removing a core (or product) cut off the workpiece. In FIG. 2, reference numeral 7 designates an upper nozzle; 8, a lower nozzle; and 9, a core cut off. In FIG. 3B, reference numeral 10 designates the remaining part of the workpiece; and 11, a machining groove.

The operation of the conventional electric discharge machine thus arranged will be described. Before an discharge machining operation is started, electric discharge machining conditions such as electrical conditions and machining speed are set. According to a predetermined program, the electric discharge machining operation is automatically carried out as follows:

The machining solution is applied between the wire electrode 1 and the workpiece 2 on the table 3 by the machining solution supplying section. Electric discharge is caused to take place between the wire electrode and the workpiece through the machining solution thus applied, to cut the workpiece along the contour 5. Upon completion of the discharge machining operation, the core 9 is cut off the workpiece, and held on the lower nozzle 8. Then, the core 9 is removed from the lower nozzle 8 with attracting means, such as an electromagnet, secured to the robot 6. Thereafter, at the next discharge machining point, the discharge machining operation is automatically carried out again in the same manner.

The automatic electric discharge machining of the workpiece 2 will be described in more detail. As shown in FIG. 3A, the machining operation is started at the machining starting hole Pl, and cutting the workpiece along the machining contour under the predetermined machining conditions is started at the point P2. That is, the wire electrode is moved clockwise as indicated by the arrow, and returned to the original point P2. In the discharge machining operation, the machining conditions are maintained unchanged. Thus, the workpiece has been cut along the machining contour.

As was described above, in the conventional wire cut electric discharge machining method, the electric discharge machining of a workpiece along a closed contour by moving the discharge machining point circularly (from the start position P2 to the same position P2) is carried out with the machining conditions maintained unchanged. Therefore, as the wire electrode 1 approaches the last point P2; that is, as the remaining part of the contour to be machined descreases, the core 9 may rock in the groove 11, for instance, because of the pressure of the machining solution as shown in FIG. 3B. Therefore, even when the wire electrode 1 has reached the last point P2, the core 9 is not completely cut off the workpiece with the remaining part 10 formed. The remaining part 10 must be manually cut. This will not only make the machining operation troublesome, but also adversely affect the machining accuracy of the cut surface. For the same reason, after the core 9 is cut off in this manner, the robot may become inoperable, so that the automatic discharge machining operation is suspended.

Furthermore in the above-described conventional method, since the discharge reaction acts on the machining part of the wire electrode 1 supported at two points above and below the workpiece 2, the wire electrode 1 is bent arcuately. Therefore, although the wire electrode has reached the predetermined final machining point, the core is not completely cut off the workpiece with the remaining part which must be manually cut later.

SUMMARY OF THE INVENTION

Accordingly, an object of this invention is to eliminate the above-described difficulties accompanying a conventional wire cut electric discharge machining method. More specifically, an object of the invention is to provide a wire cut electric discharge machining method in which a core being formed by discharge-machining a workpiece is prevented from being rocked in the machining groove of the workpiece when the wire electrode approaches the final discharge-machining point.

In a wire cut electric discharge machining method of the invention, a machining condition for cutting a core off a workpiece is provided in which, for instance, electrical conditions are made generous, and machining speed is decreased when compared with those of the machining condition provided for starting the electro-discharge machining operation.

BRIEF DESCRIPTION OF THE DRAWINGS

In the accompanying drawings, FIG. 3A is an explanatory diagram showing a machining contour along which a workpiece is to be machined, and FIG. 3B is an explanatory diagram showing a core cut off the workpiece according to the conventional method. FIG. 4A is an explanatory diagram showing a machining contour along which the workpiece is to be machined, and FIG. 4B is an explanatory diagram showing a core cut out of a workpiece by machining it according to the method of the invention.

DESCRIPTION OF THE PREFERRED EMBODIMENT

Figure 1:
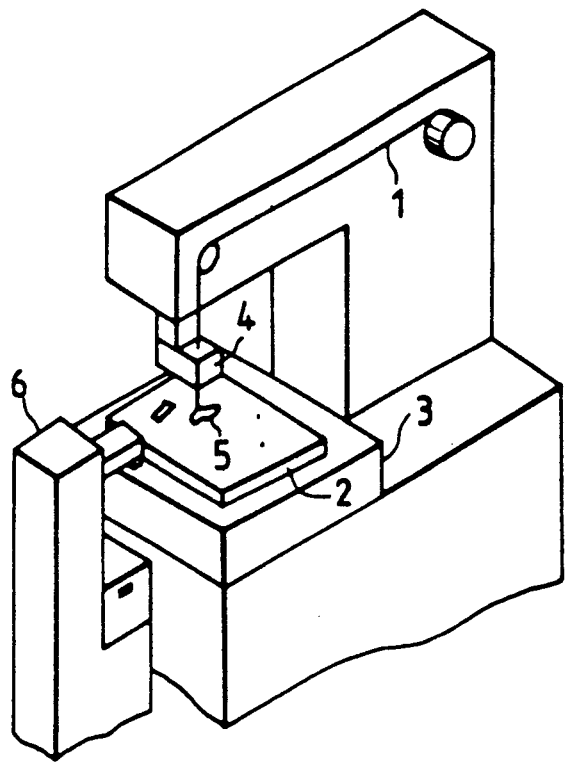
FIG. 1 is an explanatory diagram showing the arrangement of a conventional wire cut electric discharge machine.
Figure 2:
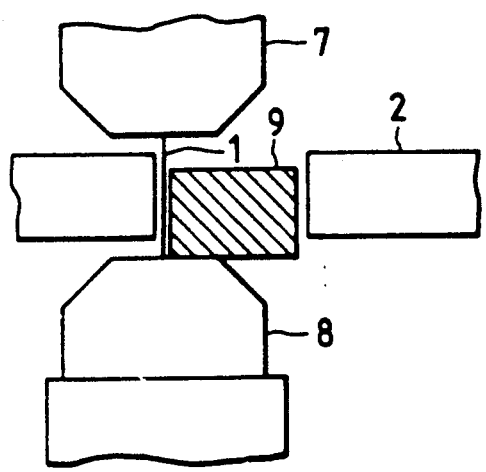
FIG. 2 is an explanatory diagram showing the section of a workpiece being machined.
Figure 3A:
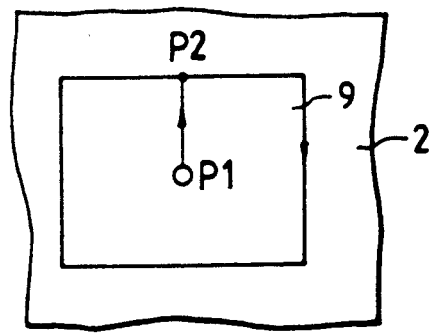
FIGS. 3A and 3B are explanatory diagrams for a description of a conventional wire cut electro-discharge machining method. More specifically.
Figure 3B:
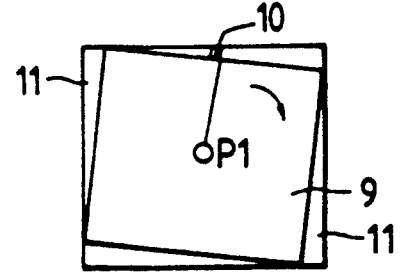
Figure 4A:
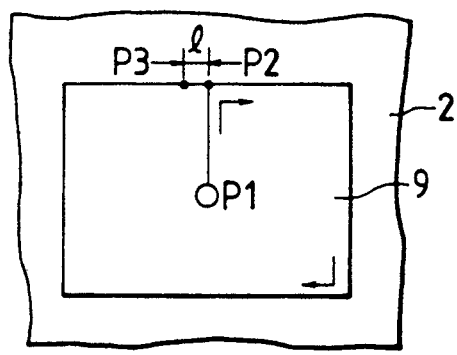
FIGS. 4A and 4B are explanatory diagrams for a description of a wire cut electric discharge machining method according to the present invention. More specifically.
Figure 4B:
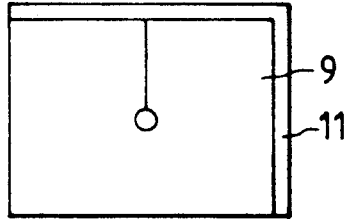
Figure 5:
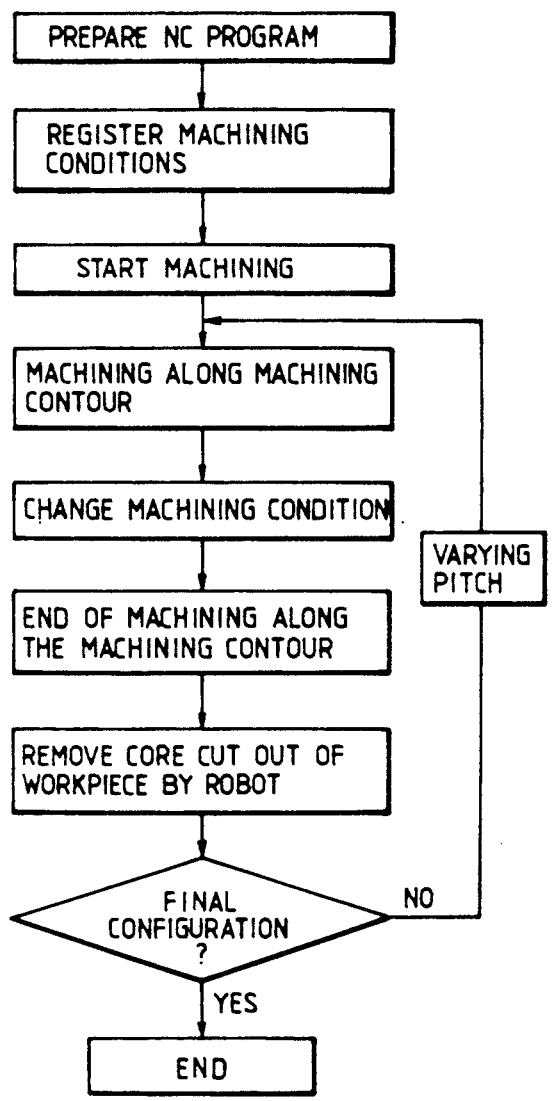
FIG. 5 is a flow chart for a description of the method of the invention.

FIGS. 4A and 4B are explanatory diagrams for a description of a wire cut electric discharge machining method according to this invention, and FIG. 5 is a flow chart therefor.

In FIGS. 4A and 4B, parts corresponding functionally to those which have been already described with FIGS. 1, 2, 3A and 3B are therefore designated by the same reference numerals or characters. In FIG. 4A, reference character P3 designates a machining condition changing point (or position), and (l), the distance between the final machining point P2 and the machining condition changing point P3.

The wire cut electric discharge machining method of the invention will be described with reference to the flow chart of FIG. 5.

First, an NC program is formed as follows: The discharge machining is started at the starting point Pl, and machining the workpiece 2 along the contour is started at the point P2. That is, the wire electrode is moved to the final machining point P2 after passing through the point P3, which is at the distance (l) from the final machining point P2. And, a machining condition number (a) for the machining starting point is added to the start block of the program, and a machining condition number (b) for cutting off a core is added to the block provided for moving the wire electrode from the point P3 to the point P2. These two machining conditions are registered, as the machining condition numbers (a) and (b), in the control unit.

In this case, the machining condition for cutting off a core (hereinafter referred to as "a cutting-off machining condition", when applicable) is so determined that, depending on the machining condition for a machining starting point (hereinafter referred to as "a starting machining condition", when applicable), for instance electrical energy may be set low and/or the machining speed. In one example of the cutting-off machining condition, the electrical energy is so determined that the peak current value is 300 A, and the pulse width is 1.5 $\mu$sec, and the pressure of the machining solution is 2 kg/cm$^2$.

In the embodiment, an electric discharging machining operation is started at the point P1, and the discharge-machining of the workpiece along the machining contour is started at the point P2. That is, the workpiece is machined with the starting machining condition added to the start block. When the wire electrode is moved along the machining contour, as indicated by the arrow, to the point P3, then the machining number (b) added to the block provided for the movement of the wire, electrode from the point P3 to the point P2 is called and utilized, so that the machining condition is switched over to the cutting-off machining condition. With the cutting-off machining condition, the wire electrode is moved over the distance (l). Thus, the electro-discharge machining operation has been accomplished as shown in FIG. 4B. Since the workpiece is machined with the cutting-off machining condition, the core 9 is cut off the workpiece without rocking itself. The core 9 thus cut off is removed by a robot or the like, and the wire electrode is moved to the following start point. The above-described operation is repeatedly carried out until all the cores have been cut out of the workpiece.

In the embodiment, the distance (l) is for instance about 0.5 mm.

In the above-described embodiment, the machining contour is rectangular as shown in FIGS. 4A and 4B. However, the technical concept of the invention is applicable to other closed-loop-shaped contours such as a circle and an ellipse. Furthermore in the above-described embodiment, two machining conditions employed; however, the cutting-off machining condition may be changed stepwise, or it may be gradually released with the movement of the wire electrode over the distance (l). As the case may be, a method may be employed in which the final discharge machining point is shifted over the machining start point on the contour so that the initial part of the contour is traced with the wire electrode twice. That is, all that is required for the cutting-off machining condition is, in a wide sense, to prevent the difficulty that the contour is not completely traced with the wire electrode, thus forming the above-described remaining part.

As was described, in the method of the invention, in cutting a core out of a workpiece, the cutting-off machining condition is employed with which allows the wire electrode to trace the contour completely, thus forming no remaining part therein. Therefore, the step of cutting the workpiece along the remaining part of the contour later to cut the core off the workpiece is eliminated, with the result that the core is positively cut out of the workpiece without adversely affecting the machining accuracy of the cut surface. Thus, the automatic electro-discharge machining operation can be continuously carried out.

Thus, according to the invention, the discharge-machining of a workpiece along a contour can be automatically and continuously carried out with high accuracy.

What is claimed is:

1. A wire cut electric discharge machining method in which an electric discharge is generated between a workpiece and a wire electrode through a machining solution to machine said workpiece along a machining contour to cut a core out of said workpiece, and said core is automatically removed therefrom to carry out a wire cut electric discharge machining operation automatically and continuously, comprising the steps of:

determining at least initial machining conditions and cutting-off machining conditions to carry out the electric discharge machining;

machining said workpiece along the machining contour from a start point of the machining contour to a predetermined machining condition changeover point under said initial machining conditions such that a majority of said machining contour has been cut and a remaining, predetermined final machining length along said machining contour remains intact for the purpose of supporting said core; and changing the initial machining conditions to said cutting-off machining conditions to cut said predetermined final machining length along the machining contour, said cutting-off machining conditions having at least one of a machining speed which is decreased with respect to a machining speed of said initial machining conditions and an electrical machining condition which is decreased with respect to an electrical machining condition of said initial machining conditions, to positively cut said core out of said workpiece without adversely affecting a machining accuracy of the cut surface, and to minimize the potential for disturbance of a position of said core relative to said workpiece before a contour of said core is completely machined.

2. The method as defined in claim 1 wherein the predetermined length is 0.5 mm.

3. The method as defined in claim 1 wherein a plurality of machining conditions are determined so that the change of machining conditions is accomplished stepwise to a final machining condition.

4. The method as defined in claim 1 wherein the initial and cutting-off machining conditions change with respect to said electrical machining condition, said electrical machining condition being the energy of said electrical discharge.

5. A wire cut electric discharge machining method in which an electric discharge is generated between a workpiece and a wire electrode through a machining solution to machine said workpiece along a machining contour to cut a core out of said workpiece, and said core is automatically removed therefrom to carry out a wire cut electric discharge machining operation automatically and continuously, comprising the steps of:

determining at least first and second machining conditions to carry out the electric discharge machining;

machining said workpiece along the machining contour from a start point of the machining contour to a predetermined machining condition changeover point under said first machining condition; and changing the first machining condition to said second machining condition to cut said core out of said workpiece at a predetermined final machining length along the machining contour wherein each said first and second machining condition comprises an electrical discharge energy applied between said electrode and said workpiece, the electrical discharge energy of said second machining condition being reduced with respect to the electrical discharge energy of said first machining condition, and wherein the electrical energy of one of said first and second machining conditions is a pulse current having a peak value of 300 A and a pulse width of 1.5 $\mu$sec under the condition that the pressure of the machining solution is 2 kg/cm$^2$.

* * * * *